US009741126B1

(12) United States Patent
Pielawa et al.

(10) Patent No.: US 9,741,126 B1
(45) Date of Patent: Aug. 22, 2017

(54) EDGE AND VERTEX BASED SEGMENTING OF A THREE DIMENSIONAL SURFACE MESH (71) Applicant: Yowza LTD., Tel Aviv (IL)

(72) Inventors: Susanne Pielawa, Tel Aviv (IL); Shir Peled, Pardes Hanna-Kakur (IL); Mor Amitai, Tel-aviv (IL)

(73) Assignee: YOWZA, LTD., Tel Aviv (IL)

( * ) Notice: Subject to any disclaimer, the term of this patent is extended or adjusted under 35 U.S.C. 154(b) by 224 days.

(21) Appl. No.: 14/753,047

(22) Filed: Jun. 29, 2015

(51) Int. Cl.
*G06K 9/00* (2006.01)
*G06T 7/00* (2017.01)
*G06T 17/20* (2006.01)

(52) U.S. Cl.
CPC .......... *G06T 7/0083* (2013.01); *G06T 7/0089* (2013.01); *G06T 17/20* (2013.01); *G06T 2207/10024* (2013.01)

(58) Field of Classification Search
CPC ..... G06T 7/0083; G06T 17/20; G06T 7/0089; G06T 2207/10024
See application file for complete search history.

(56) References Cited

U.S. PATENT DOCUMENTS

2001/0013866 A1* 8/2001 Migdal .................. G06T 17/20 345/423
2010/0138195 A1* 6/2010 Onodera ................ G06T 17/20 703/1

* cited by examiner

*Primary Examiner* — Chan Park
*Assistant Examiner* — Elisa Rice
(74) *Attorney, Agent, or Firm* — Reches Patents (57) ABSTRACT

A method for segmenting a mesh, the method may include receiving or generating the mesh, wherein the mesh is a three dimensional surface mesh that represents a three dimensional object and comprises vertexes, edges and faces; finding, by a computerized search module, first edges of the mesh that have an edge angle below an edge angle threshold; wherein each first edge is a border of a pair of faces of the mesh and wherein an edge angle of a first edge is an angle between normals to the pair of faces; finding, by the computerized search module, first vertices of the mesh that have a negative angular defect that is below a negative angular defect threshold and have exactly one neighboring first edge; wherein each first vertex is shared by multiple faces of the mesh; wherein an angular defect of a first vertex is responsive to angles between all pairs of neighboring faces of the edges that share one of the multiple faces; finding, by the computerized search module, second edges of the mesh that link the first vertices of the mesh; clustering faces of the edge to provide first clusters by joining faces of the mesh that share and edge of the mesh that is not a first edge and is not a second edge; searching, by the computerized search module, for cutting edges out of the boundaries between the first clusters; and segmenting, by a computerized segmentation module, the mesh along the cutting edges to provide mesh segments.

25 Claims, 8 Drawing Sheets

Calculating, by the computerized search module, average edge angles and sums of angular defects for the boundaries between the first clusters. 171

Selecting the cutting edges in response to the average edge angles and the sums of angular defects. 172

Selecting as cutting edge candidates boundaries between the first clusters that have an average edge angle that exceeds an average threshold and have a sum of angular defects that exceeds a sum threshold. 173

Virtually segmenting the mesh, for each cutting edge candidate, along two edges that are connected to the cutting edge candidate to provide a first virtual mesh segment and a second virtual mesh segment. 174

Calculating, for each cutting edge candidate, a first angular defect and a second angular defect, in response to the first virtual mesh segment and a second virtual mesh segment, respectively. 175

Selecting, as cutting edges, cutting edge candidates that have a positive first angular defect and a positive second angular defect. 176

FIG. 8

EDGE AND VERTEX BASED SEGMENTING OF A THREE DIMENSIONAL SURFACE MESH

BACKGROUND OF THE INVENTION

Three dimensional objects may be represented by a three dimensional surface mesh that includes a plurality of faces.

There is a growing need to segment the three dimensional surface mesh to meaningful parts.

SUMMARY

There may be provided a non-transitory computer readable medium that may store instructions that once executed by a computer cause the computer to execute the stages of receiving or generating the mesh, wherein the mesh is a three dimensional surface mesh that represents a three dimensional object and may include vertexes, edges and faces; finding, by a computerized search module, first edges of the mesh that have an edge angle below an edge angle threshold; wherein each first edge is a border of a pair of faces of the mesh and wherein an edge angle of a first edge is an angle between normals to the pair of faces; finding, by the computerized search module, first vertices of the mesh that have a negative angular defect that is below a negative angular defect threshold and have exactly one neighboring first edge; wherein each first vertex is shared by multiple faces of the mesh; wherein an angular defect of a first vertex is responsive to angles between all pairs of neighboring faces of the edges that share one of the multiple faces; finding, by the computerized search module, second edges of the mesh that link the first vertices of the mesh; clustering faces of the edge to provide first clusters by joining faces of the mesh that share and edge of the mesh that is not a first edge and is not a second edge; searching, by the computerized search module, for cutting edges out of the boundaries between the first clusters; and segmenting, by a computerized segmentation module, the mesh along the cutting edges to provide mesh segments.

According to an embodiment of the invention there may be provided a method for segmenting a mesh, the method may include receiving or generating the mesh, wherein the mesh is a three dimensional surface mesh that represents a three dimensional object and may include vertexes, edges and faces; finding, by a computerized search module, first edges of the mesh that have an edge angle below an edge angle threshold; wherein each first edge is a border of a pair of faces of the mesh and wherein an edge angle of a first edge is an angle between normals to the pair of faces; finding, by the computerized search module, first vertices of the mesh that have a negative angular defect that is below a negative angular defect threshold and have exactly one neighboring first edge; wherein each first vertex is shared by multiple faces of the mesh; wherein an angular defect of a first vertex is responsive to angles between all pairs of neighboring faces of the edges that share one of the multiple faces; finding, by the computerized search module, second edges of the mesh that link the first vertices of the mesh; clustering faces of the edge to provide first clusters by joining faces of the mesh that share an edge of the mesh that is not a first edge and is not a second edge; searching, by the computerized search module, for cutting edges out of the boundaries between the first clusters; and segmenting, by a computerized segmentation module, the mesh along the cutting edges to provide mesh segments.

The searching for the cutting edges may include calculating, by the computerized search module, average edge angles and sums of angular defects for the boundaries between the first clusters; and selecting the cutting edges in response to the average edge angles and the sums of angular defects.

The selecting of the cutting edge may include selecting boundaries between the first clusters that have a negative average edge angle that exceeds a negative average threshold in absolute value, and have a negative sum of angular defects that exceeds a negative sum threshold in absolute value.

The method may include the selecting of the cutting edge may include selecting as cutting edge candidates boundaries between the first clusters that have an average edge angle below an average threshold and have a sum of angular defects below a sum threshold; virtually segmenting the mesh, for each vertex that is shared by two cutting edge candidates, along those two cutting edge candidates to provide a first virtual mesh segment and a second virtual mesh segment; calculating, for each vertex that is shared by two cutting edge candidates, a first angular defect and a second angular defect, in response to the first virtual mesh segment and a second virtual mesh segment, respectively; and selecting, as cutting edges, cutting edge candidates that neighbor vertices have a positive first angular defect and a positive second angular defect.

The angular defect of the first vertex is responsive to a sum of the angles between all pairs of neighboring faces of the edges that share one of the multiple faces.

The angular defect of the first vertex may equal three hundred and sixty degrees minus the sum of the angles between all pairs of neighboring faces of the edges that share one of the multiple faces.

The receiving or generating of the mesh may be followed by performing a mesh-decimation process on an initial mesh to provide the mesh.

The receiving or generating of the mesh may be followed by clustering neighboring edges that are positioned as a density that exceeds a density threshold.

The method may include generating a visual representation of the mesh segments.

The method may include applying an object identification process on the segments of the mesh thereby identifying the object.

The method may include printing the mesh.

The method may include printing the mesh while applying a different printing scheme for at least two mesh segments of the mesh.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

In a mesh each edge is a border of two faces of the mesh. An angle between the normals of these two faces is termed an edge angle. A positive edge angle value may be assigned to the angle between convex faces and a negative positive edge angle value may be assigned to the angle between concave faces. Other assignment of signs can be applied and the methods listed below can change accordingly.

Figure 1:
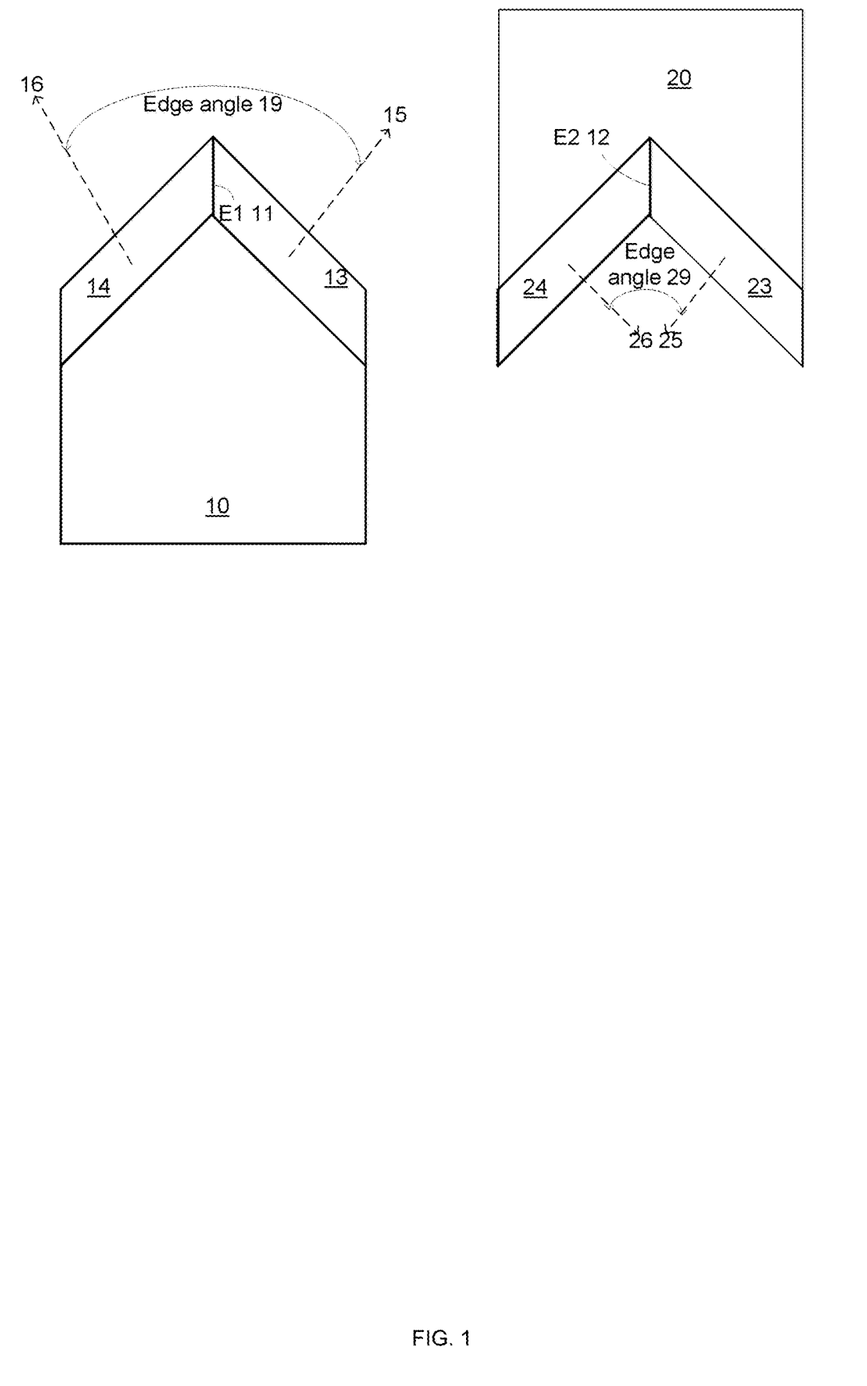
FIG. 1 illustrates various edge angles according to various embodiments of the invention.

FIG. 1 illustrates an edge E1 11 that is a border of two faces 13 and 14 of mesh 10, faces 13 and 14 have normals 15 and 16. Edge E1 11 has a positive edge angle 19.

FIG. 1 also shows an edge E2 12 that is a border of two faces 23 and 44 of mesh 20, faces 23 and 24 have normals 25 and 26. Edge E2 12 has a negative edge angle 29.

In a mesh each vertex is shared by multiple faces. An angular defect of a vertex is calculated in response to angles between all pairs of neighboring faces of the edges that share one of the multiple faces. According to an embodiment of the invention the angular defect of the vertex may be responsive to a sum of the angles between all pairs of neighboring faces of the edges that share one of the multiple faces. According to an embodiment of the invention the angular defect of the vertex may include a constant minus said sum. The constant may be three hundred and sixty degrees.

Figure 2:
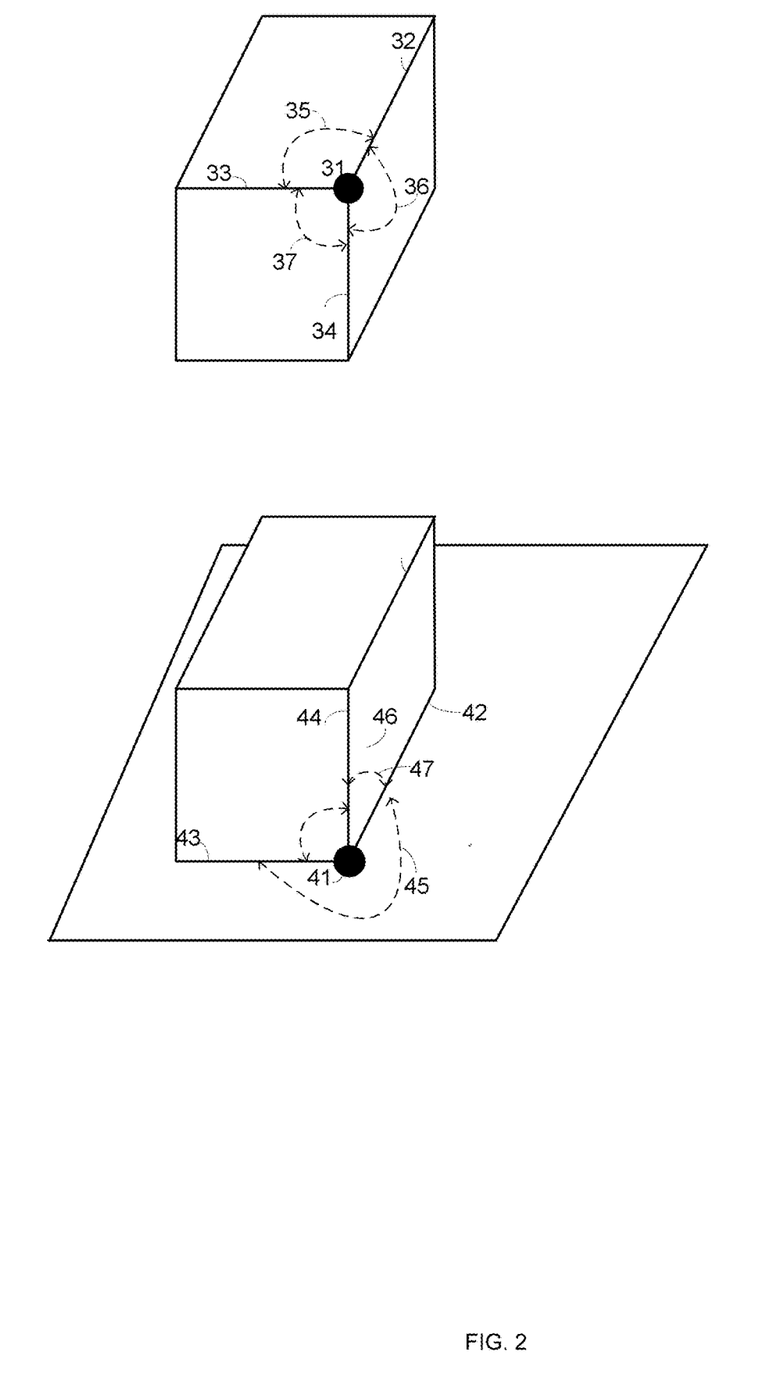
FIG. 2 illustrates various angular defects according to various embodiments of the invention.

FIG. 2 illustrates vertex 31 that is connected to three edges 32, 33 and 34 that are oriented to each other by ninety degrees and form three angles 35, 36 and 37. Vertex 31 has a positive angular defect of ninety degrees (360-90-90-90).

FIG. 2 also illustrates vertex 41 that is connected to three edges 42, 43 and 44 that are oriented and form three angles 45, 46 and 47. Vertex 41 has a negative angular defect of ninety degrees (360-270-90-90).

Figure 3:
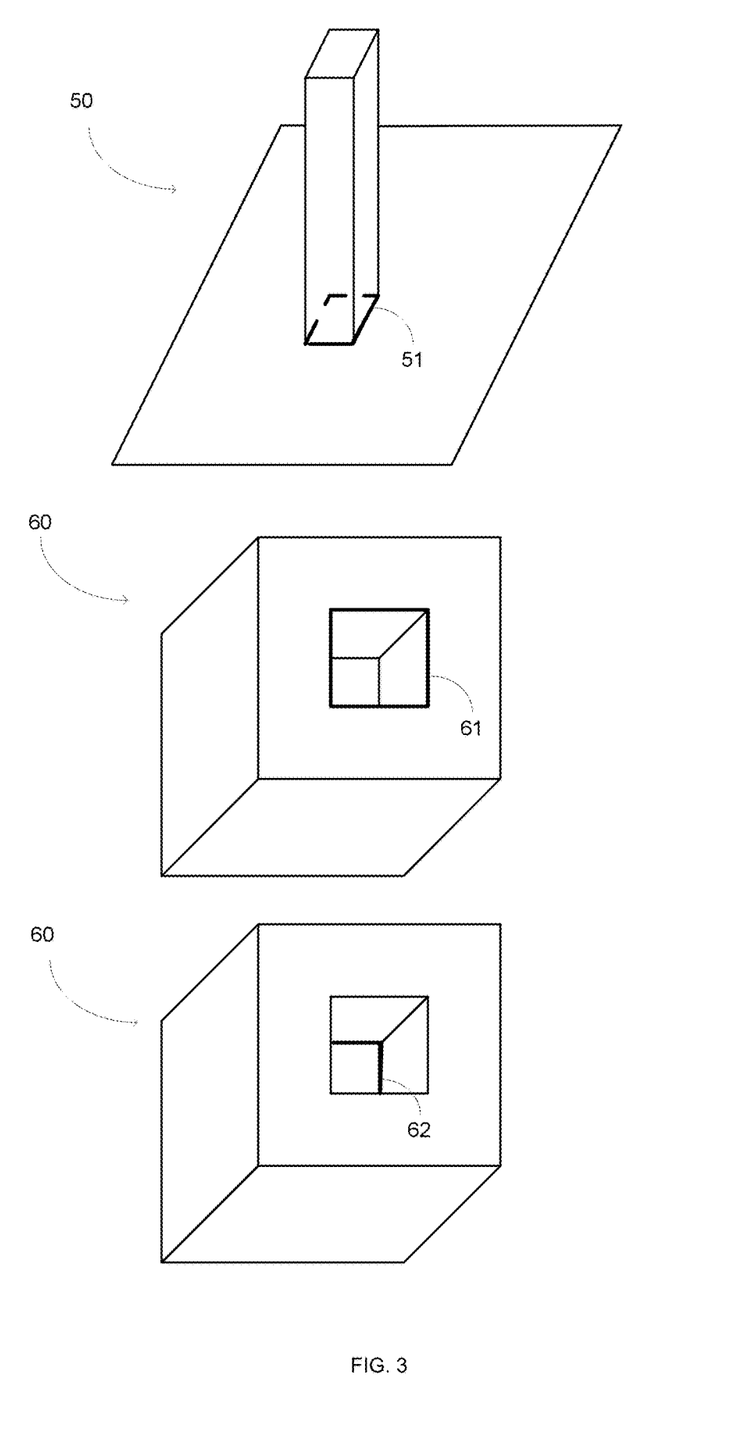
FIG. 3 illustrates cut lines according to various embodiments of the invention.

It has been surprisingly found that natural looking cuts tend to be along a path with negative average edge angle, and negative accumulated angular defect. FIG. 3 illustrates a shape 50 and a natural looking cut 51 having a negative angular defect and a negative edge angle.

FIG. 3 also illustrates shape 60 and two cuts that should be rejected—cut 61 having a negative angular defect and positive edge angle and cut 62 having a positive angular defect and a negative edge angle.

Figure 4:
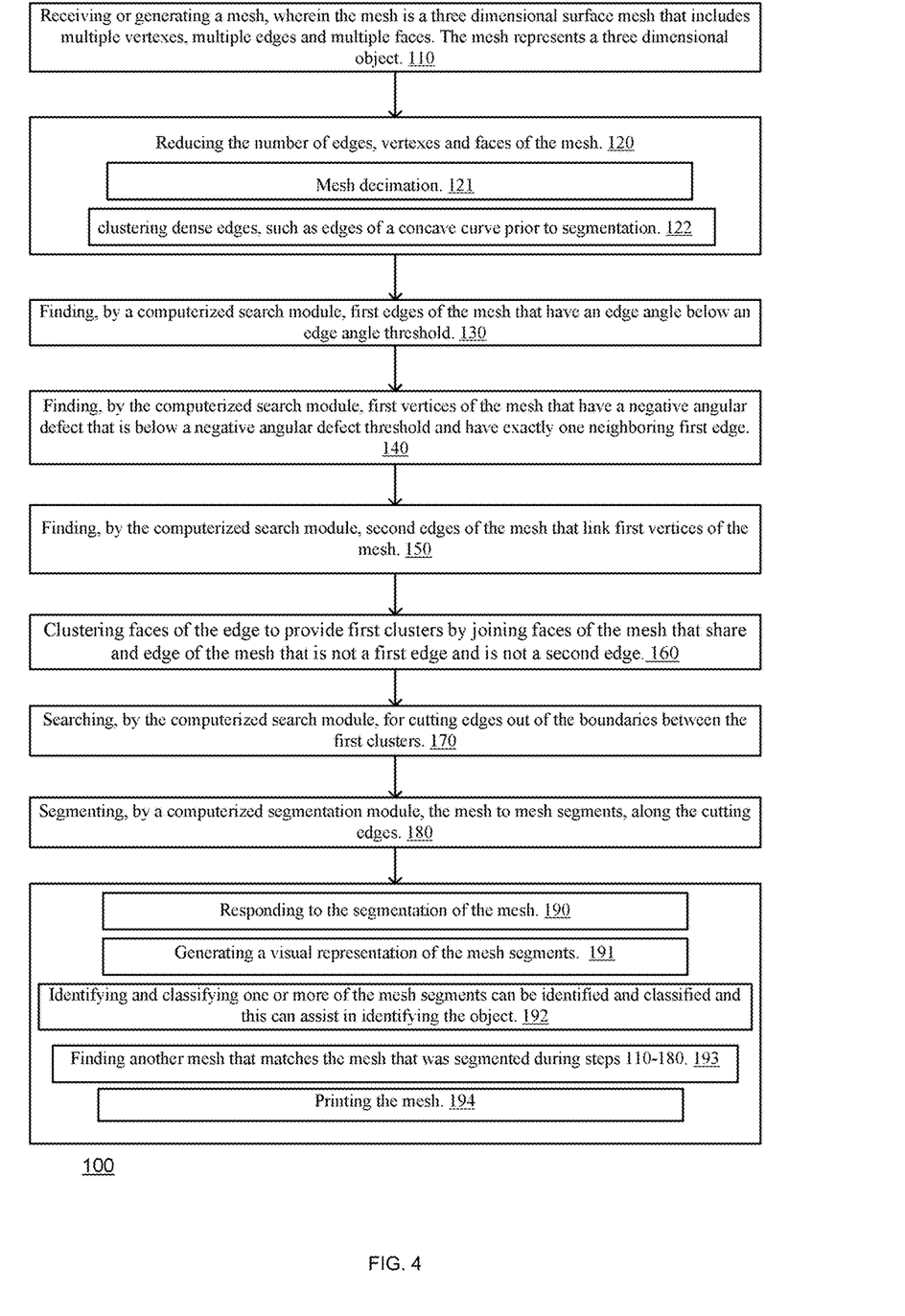
FIG. 4 illustrates a method according to an embodiment of the invention.

FIG. 4 illustrates method 100 according to an embodiment of the invention.

Method 100 may start by step 110 of receiving or generating a mesh, wherein the mesh is a three dimensional surface mesh that includes multiple vertexes, multiple edges and multiple faces. The mesh represents a three dimensional object.

The mesh may be received by a computerized system and stored in a memory module such as a random access (RAM) memory module, a read only (ROM) memory module, a flash memory module and the like.

The mesh may be stored in a mesh memory space of the memory module.

Step 110 may be followed by step 120 of reducing the number of edges, vertexes and faces of the mesh. Step 120 may reduce the complexity of the mesh segmentation process and may save energy and resources allocated to the mesh segmentation process.

Step 120 may include step 121 of mesh decimation. Mesh decimation reduces the number of faces of the mesh by successively joining two neighboring vertices. A priority function chooses which two vertices to join. This priority function can be changed in such a way to give priority to creating sharp edges. Each face of the original mesh can be mapped to a face in the resulting mesh.

Step 120 may include step 122 of clustering dense edges, such as edges of a concave curve prior to segmentation.

Step 122 may include representing a group of edges with negative edge angle by a single edge. An edge angle of the resulting edge is the sum of the edge angles of the collapsed edges. In this way many edges with slightly negative edge angle will be replaced by a new edge with a larger negative edge angle. Applying the above mentioned algorithm to the resulting model will allow segmenting meshes with rounder features.

Step 110 or step 120 may be followed by step 130 of finding, by a computerized search module, first edges of the mesh that have an edge angle below an edge angle threshold. A non limiting example of an edge angle threshold may be minus eighteen degrees.

Step 130 may be followed by step 140 of finding, by the computerized search module, first vertices of the mesh that have a negative angular defect that is below a negative angular defect threshold and have exactly one neighboring first edge. An example of a negative angular defect threshold may equal minus thirty six degrees.

Step 140 may be followed by step 150 of finding, by the computerized search module, second edges of the mesh that link first edges of the mesh.

Step 150 may be followed by step 160 of clustering faces of the edge to provide first clusters by joining faces of the mesh that share and edge of the mesh that is not a first edge and is not a second edge.

Step 160 may be followed by step 170 of searching, by the computerized search module, for cutting edges out of the boundaries between the first clusters.

Step 170 may be followed by step 180 of segmenting, by a computerized segmentation module, the mesh to provide mesh segments along the cutting edges. The segmenting may include storing, in a memory module, information about the different segments of the mesh. For example the memory module may store a mapping of edges and faces and mesh segments that include these edges and faces. Yet for another example the memory module may store a list of mesh segment borders.

Step 180 may be followed by step 190 of responding to the segmentation of the mesh.

Step 190 may include step 191 of generating a visual representation of the mesh segments. The visual representation may be displayed to a user. In the visual representation different mesh segments can be of different color and/or texture. The visual representation may illustrate the borders between the edge segments, and the like.

The segmentation process may assist in classifying the object represented by the mesh.

Step 190 may include step 192 of identifying and classifying one or more of the mesh segments and this can assist in identifying the object.

For example, a mesh that represents a chair may be segmented to mesh segments such as legs, back, arms and base.

Some or all of the mesh segments may be classified and this classification can assist in classifying the chair. The classification of the chair may assist in reducing the cost of finding chairs that match (or are similar to) the chair.

Assuming that a mesh represents a chair is classified as including four rounded legs, a pair of rounded arms and an apertured back. Finding a match to such a chair will be more efficient that trying to find a match to the chair without knowing these classifications.

Step 192 may be followed by step 193 of finding another mesh that matches the mesh that was segmented during steps 110-180.

Step 190 may include step 194 of printing the mesh.

Step 194 may include printing the mesh while applying a different printing scheme for at least two mesh segments of the mesh. The printing schemes may differ from each other by color, by a material of the mesh segments, by the viscosity of the printing material, by the temperature of the printing process, by the accuracy of the printing process, by the speed of the printing process.

Figure 5:
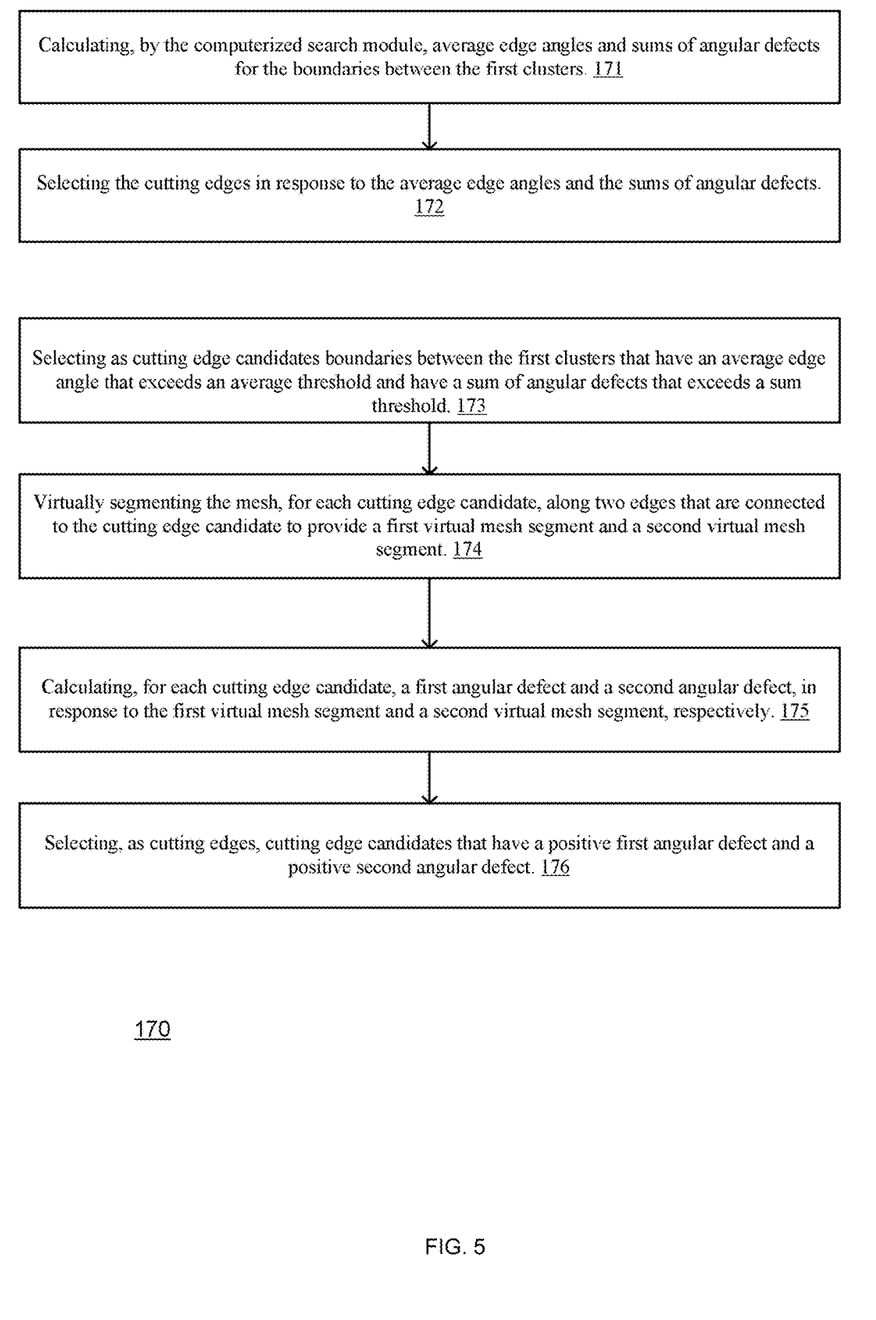
FIG. 5 illustrates a step of the method of FIG. 4 according to an embodiment of the invention.

FIG. 5 illustrates various steps of the searching for the cutting edges according to an embodiment of the invention.

The searching for the cutting edges is denoted 170 in FIG. 4.

Step 170 may include steps 171 and 172 and, additionally or alternatively steps 173, 174, 175 and 176.

Step 171 may include calculating, by the computerized search module, average edge angles and sums of angular defects for the boundaries between the first clusters. The average of edge angles of a boundary between a pair of two clusters is a weighted average of edge angles of all edges of the boundary between the first clusters. The average is weighted by edge length.

Step 171 followed by step 172.

Step 172 may include selecting the cutting edges in response to the average edge angles and the sums of angular defects.

Step 172 may include selecting boundaries between the first clusters that have an average edge angle that exceeds an average threshold and have a sum of angular defects that exceeds a sum threshold. A non-limiting example of an average threshold may be minus eighteen degrees. The sum threshold may be minus one hundred and eighty degrees.

Steps 173, 174, 175 and 176 for executed one after the other.

Step 173 may include selecting as cutting edge candidates boundaries between the first clusters that have a negative average edge angle that exceeds a negative average threshold in absolute value and have a negative sum of angular defects that exceeds a negative sum threshold in absolute value.

Step 174 may include virtually segmenting the mesh, for vertex that is shared by two cutting edge candidates, along those two cutting edge candidates to provide a first virtual mesh segment and a second virtual mesh segment.

Step 175 may include calculating, for each vertex that is shared by two cutting edge candidates, a first angular defect and a second angular defect, in response to the first virtual mesh segment and a second virtual mesh segment, respectively.

Step 176 may include selecting, as cutting edges, cutting edge candidates whose neighboring vertices have a positive first angular defect and a positive second angular defect.

Figure 6:
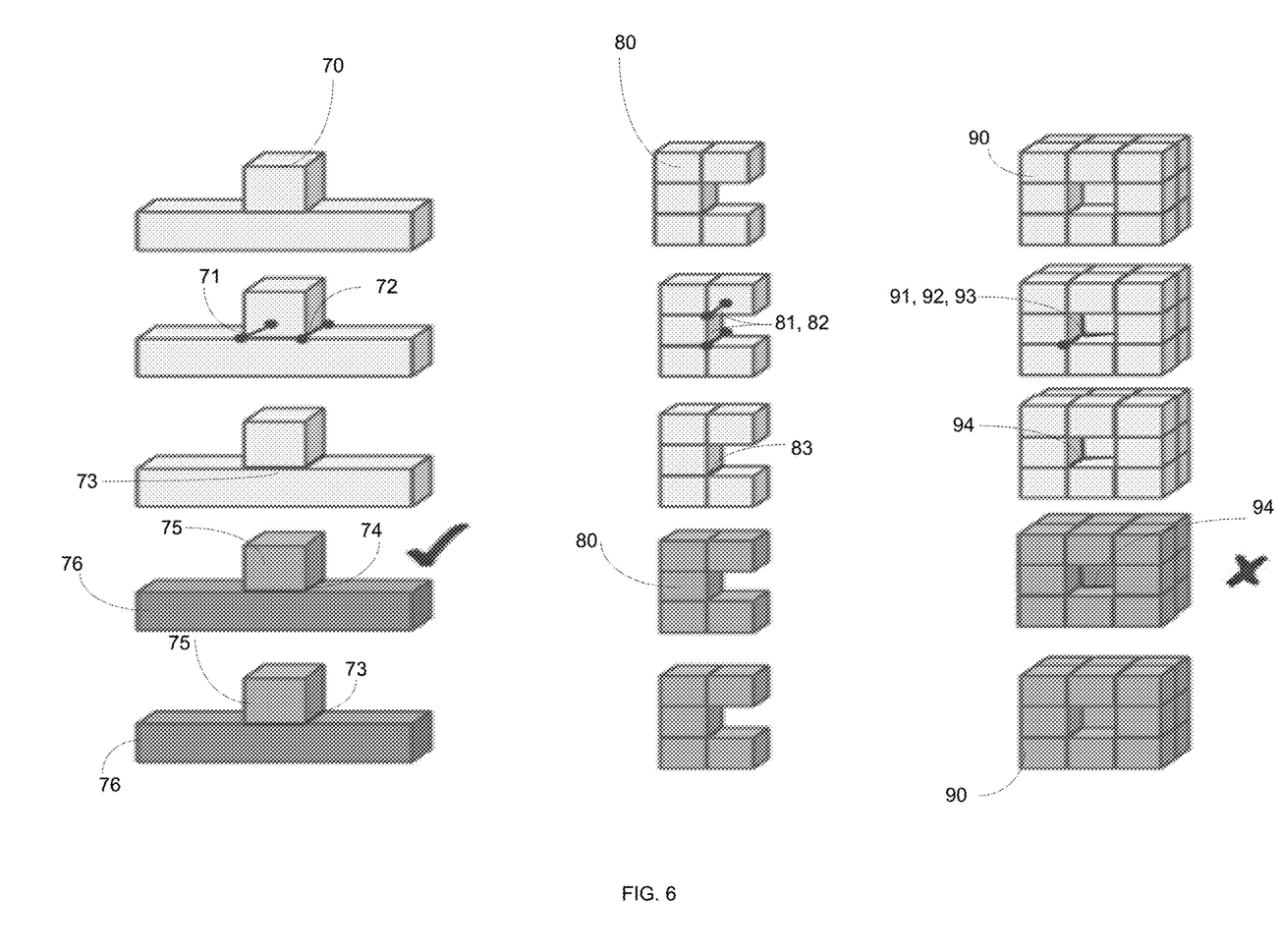
FIGS. 6 and 7 illustrate mesh segments and segmentation attempts according to various embodiments of the invention.

FIG. 6 illustrates results of an applying of method 100 on three meshes 70, 80 and 90 according to an embodiment of the invention.

Mesh 70 represents an inverted T-shaped object. Mesh 80 represents a C-shaped object. Mesh 90 represents a hollow cube shaped object.

Applying steps 130 and 140 on mesh 70 results in finding first edges 71 and 72.

Applying step 150 on mesh 70 results in finding second edges 73 that link the first vertices related to first edges 71 and 72. Another second edge is not shown.

Applying steps 160 and 170 on mesh 70 results in finding cutting edge 74 that segments mesh 70 to first mesh segment 75 and second mesh segment 76.

Applying step 180 on mesh 70 results in segmenting mesh 70 to first mesh segment 75 and second mesh segment 76.

Applying method 100 on mesh 80 and mesh 90 results in a failure—as the method 100 selects to reject the cutting edges suggested during step 170. FIG. 6 illustrates first edges 81 and 82 of mesh 80, finding a cutting edge 83 and rejecting that cutting edge. FIG. 6 illustrates first edges 91, 92 and 93 of mesh 90, finding a cutting edge 94 and rejecting that cutting edge.

Figure 7:
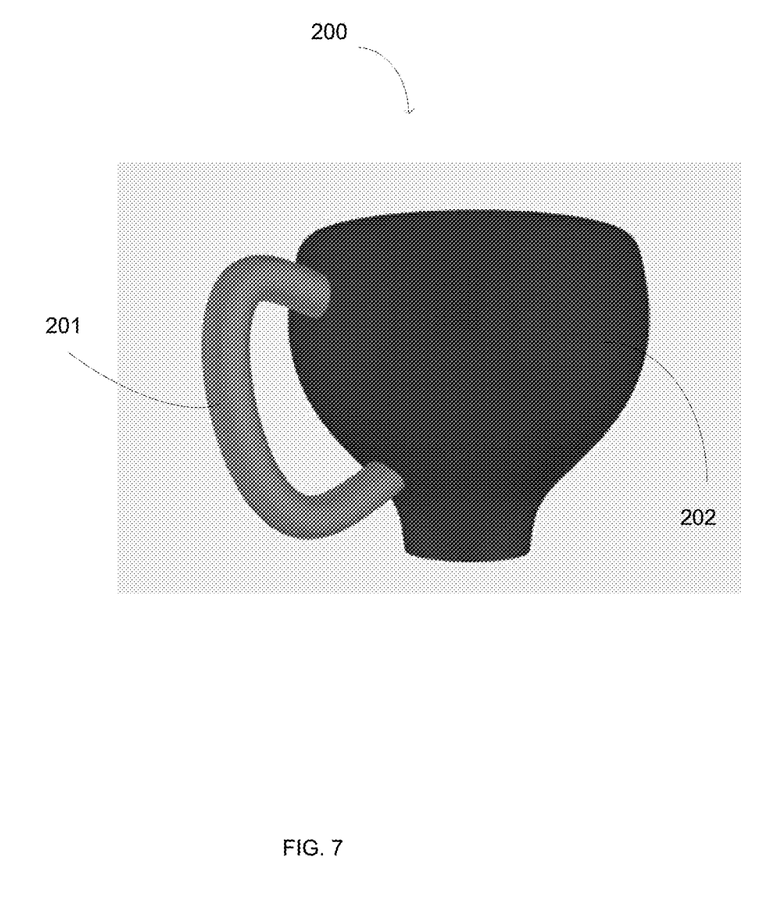

FIG. 7 illustrates segmentation of mesh 200 according to an embodiment of the invention.

Mesh 200 was segmented to mesh segments 201 and 202 using method 100.

Figure 8:
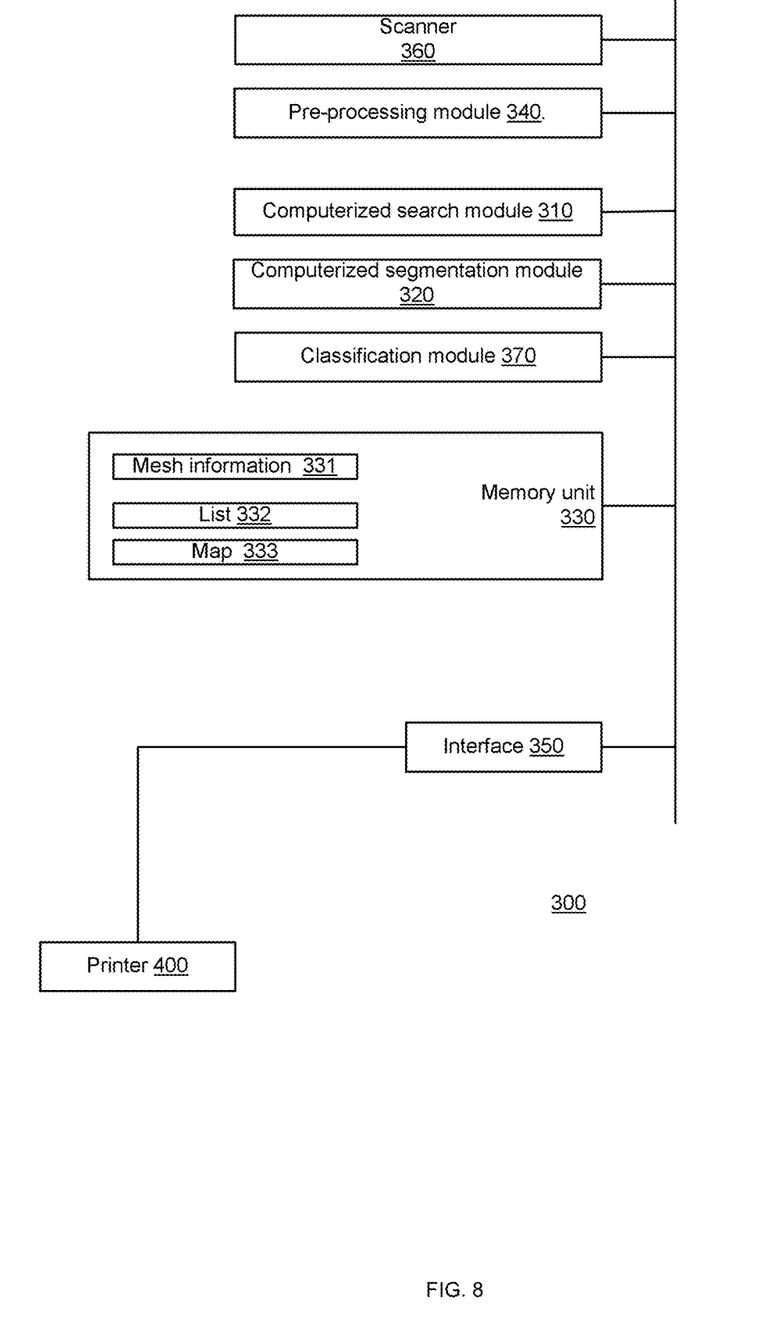
FIG. 8 illustrates a system according to an embodiment of the invention.

FIG. 8 illustrates a system 700 according to an embodiment of the invention.

System 300 includes memory module 330, computerized search module 310, pre-processing module 340, and computerized segmentation module 320.

Pre-processing module 340 is configured to execute step 120 of method 100.

Computerized search module 310 is configured to execute steps 130, 140, 150, 160 and 170 of method 100.

Computerized segmentation module 320 is configured to execute step 180 of method 100.

FIG. 8 illustrates memory module 330 as storing mesh information 331, list of mesh segment boundaries (denoted list 331) and a mapping (denoted map 332) between faces, edges and/or vertices and the mesh segments.

Mesh information 311 represents the mesh. Mesh information 331 may represent the mesh before applying step 120, after applying step 120 or both before applying step 120 and after applying step 120.

System 300 also includes an interface 350 for coupling the system 300 to one or more networks (not shown).

Interface 350 may be coupled to printer 400 for printing the object represented by the mesh. Printer 400 may be a three dimensional printer. Alternatively system 300 may be a three dimensional printer and interface 350 is coupled to a printing module of the printer.

According to an embodiment of the invention

System 300 is also illustrated as including a scanner 360 for generating the mesh by performing a three dimensional scan (for example using one or more beams of electromagnetic radiation) of the object.

System 300 is also illustrated as including a classification module 370 for classifying and/or identifying the mesh and/or mesh segments.

Additionally or alternatively, interface 350 may be coupled to a database 410 of meshes and system 300 may search, using match module 360 for one or more matching meshes to the mesh generated by system 300.

Memory unit 330 may be a volatile memory, a non-volatile memory or a combination of both.

Each one of computerized search module 310, pre-processing module 340, classification module 370 and computerized segmentation module 320 can be a hardware module that may include one or more hardware processors such as image processors, a central processing unit, a FPGA, a tailored hardware, and the like.

The same hardware processor can be used for implementing one or more module of computerized search module 310, pre-processing module 340, computerized segmentation module 320 and classification module 370.

The segmentation process illustrated in this specification provides a highly accurate and automatic segmentation that is capable of segmenting three dimensional meshes in an accurate manner and may be applied on multiple three dimensional meshes in a reliable manner and to provide segmented three dimensional meshes.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for segmenting a mesh, the method comprises:
   receiving or generating the mesh, wherein the mesh is a three dimensional surface mesh that represents a three dimensional object and comprises vertexes, edges and faces;
   finding, by a computerized search module, first edges of the mesh that have an edge angle below an edge angle threshold; wherein each first edge is a border of a pair of faces of the mesh and wherein an edge angle of a first edge is an angle between normals to the pair of faces;
   finding, by the computerized search module, first vertices of the mesh that have a negative angular defect that is below a negative angular defect threshold and have exactly one neighboring first edge; wherein each first vertex is shared by multiple faces of the mesh; wherein an angular defect of a first vertex is responsive to angles between all pairs of neighboring faces of the edges that share one of the multiple faces;
   finding, by the computerized search module, second edges of the mesh that link the first vertices of the mesh;

clustering faces to provide first clusters by joining faces of the mesh that share an edge of the mesh that is not a first edge and is not a second edge;

searching, by the computerized search module, for cutting edges out of the boundaries between the first clusters; and segmenting, by a computerized segmentation module, the mesh along the cutting edges to provide mesh segments.

2. The method according to claim 1 wherein the searching for the cutting edges comprises:

calculating, by the computerized search module, average edge angles and sums of angular defects for the boundaries between the first clusters; and selecting the cutting edges in response to the average edge angles and the sums of angular defects.

3. The method according to claim 2 wherein the selecting of the cutting edges comprises selecting boundaries between the first clusters that have a negative average edge angle that exceeds a negative average threshold in absolute value, and have a negative sum of angular defects that exceeds a negative sum threshold in absolute value.

4. The method according to claim 2 comprising the selecting of the cutting edge comprises:

selecting as cutting edge candidates boundaries between the first clusters that have an average edge angle that below an average threshold and have a sum of angular defects below a sum threshold;

virtually segmenting the mesh, for each vertex that is shared by two cutting edge candidates, along those two cutting edge candidates to provide a first virtual mesh segment and a second virtual mesh segment;

calculating, for each vertex that is shared by two cutting edge candidates, a first angular defect and a second angular defect, in response to the first virtual mesh segment and a second virtual mesh segment, respectively; and selecting, as cutting edges, cutting edge candidates that neighbor vertices have a positive first angular defect and a positive second angular defect.

5. The method according to claim 1 wherein the angular defect of the first vertex is responsive to a sum of the angles between all pairs of neighboring faces of the edges that share one of the multiple faces.

6. The method according to claim 5 wherein the angular defect of the first vertex equals three hundred and sixty degrees minus the sum of the angles between all pairs of neighboring faces of the edges that share one of the multiple faces.

7. The method according to claim 1 wherein the receiving or generating of the mesh is followed by performing a mesh-decimation process on an initial mesh to provide the mesh.

8. The method according to claim 1 wherein the receiving or generating of the mesh is followed by clustering neighboring edges that are positioned as a density that exceeds a density threshold.

9. The method according to claim 1 comprising generating a visual representation of the mesh segments.

10. The method according to claim 1 comprising applying an object identification process on the segments of the mesh thereby identifying the object.

11. The method according to claim 1 further comprising printing the mesh.

12. The method according to claim 1 further comprising printing the mesh while applying a different printing scheme for at least two mesh segments of the mesh.

13. A non-transitory computer readable medium that stores instructions that once executed by a computer causes the computer to execute the steps of:

receiving or generating the mesh, wherein the mesh is a three dimensional surface mesh that represents a three dimensional object and comprises vertexes, edges and faces;

finding, by a computerized search module, first edges of the mesh that have an edge angle below an edge angle threshold; wherein each first edge is a border of a pair of faces of the mesh and wherein an edge angle of a first edge is an angle between normals to the pair of faces;

finding, by the computerized search module, first vertices of the mesh that have a negative angular defect that is below a negative angular defect threshold and have exactly one neighboring first edge; wherein each first vertex is shared by multiple faces of the mesh; wherein an angular defect of a first vertex is responsive to angles between all pairs of neighboring faces of the edges that share one of the multiple faces;

finding, by the computerized search module, second edges of the mesh that link the first vertices of the mesh;

clustering faces to provide first clusters by joining faces of the mesh that share an edge of the mesh that is not a first edge and is not a second edge;

searching, by the computerized search module, for cutting edges out of the boundaries between the first clusters; and segmenting, by a computerized segmentation module, the mesh along the cutting edges to provide mesh segments.

14. The non-transitory computer readable medium according to claim 13 wherein the searching for the cutting edges comprises:

calculating, by the computerized search module, average edge angles and sums of angular defects for the boundaries between the first clusters; and selecting the cutting edges in response to the average edge angles and the sums of angular defects.

15. The non-transitory computer readable medium according to claim 14 wherein the selecting of the cutting edge comprises selecting boundaries between the first clusters that have a negative average edge angle that exceeds a negative average threshold in absolute value, and have a negative sum of angular defects that exceeds a negative sum threshold in absolute value.

16. The non-transitory computer readable medium according to claim 14 wherein the selecting of the cutting edge comprises: selecting as cutting edge candidates boundaries between the first clusters that have an average edge angle below an average threshold and have a sum of angular defects below a sum threshold; virtually segmenting the mesh, for each vertex that is shared by two cutting edge candidates, along those two cutting edge candidates to provide a first virtual mesh segment and a second virtual mesh segment; calculating, for each vertex that is shared by two cutting edge candidates, a first angular defect and a second angular defect, in response to the first virtual mesh segment and a second virtual mesh segment, respectively; and selecting, as cutting edges, cutting edge candidates that neighbor vertices have a positive first angular defect and a positive second angular defect.

17. The non-transitory computer readable medium according to claim 13 wherein the angular defect of the first vertex is responsive to a sum of the angles between all pairs of neighboring faces of the edges that share one of the multiple faces.

18. The non-transitory computer readable medium according to claim 17 wherein the angular defect of the first vertex equals three hundred and sixty degrees minus the sum of the angles between all pairs of neighboring faces of the edges that share one of the multiple faces.

19. The non-transitory computer readable medium according to claim 13 wherein the receiving or generating of the mesh is followed by performing a mesh-decimation process on an initial mesh to provide the mesh.

20. The non-transitory computer readable medium according to claim 13 wherein the receiving or generating of the mesh is followed by clustering neighboring edges that are positioned as a density that exceeds a density threshold.

21. The non-transitory computer readable medium according to claim 13 that stores instructions for generating a visual representation of the mesh segments.

22. The non-transitory computer readable medium according to claim 13 that stores instructions for applying an object identification process on the segments of the mesh thereby identifying the object.

23. The non-transitory computer readable medium according to claim 13 that stores instructions for printing the mesh.

24. The non-transitory computer readable medium according to claim 13 that stores instructions for printing the mesh while applying a different printing scheme for at least two mesh segments of the mesh.

25. A system comprising a memory module, a computerized search module and a computerized segmentation module; wherein the memory module is configured to
- store the mesh, wherein the mesh is a three dimensional surface mesh that represents a three dimensional object and comprises vertexes, edges and faces; wherein the computerized search module is configured to: find first edges of the mesh that have an edge angle below an edge angle threshold; wherein each first edge is a border of a pair of faces of the mesh and wherein an edge angle of a first edge is an angle between normals to the pair of faces;
- find first vertices of the mesh that have a negative angular defect that is below a negative angular defect threshold and have exactly one neighboring first edge; wherein each first vertex is shared by multiple faces of the mesh; wherein an angular defect of a first vertex is responsive to angles between all pairs of neighboring faces of the edges that share one of the multiple faces;
- find second edges of the mesh that link the first vertices of the mesh; cluster faces to provide first clusters by joining faces of the mesh that share an edge of the mesh that is not a first edge and is not a second edge; search for cutting edges out of the boundaries between the first clusters; and wherein the computerized segmentation module is configured to segment the mesh along the cutting edges to provide mesh segments.

* * * * *